No. 781,780. PATENTED FEB. 7, 1905.
N. LOMBARD.
GOVERNOR.
APPLICATION FILED JUNE 29, 1904.

10 SHEETS—SHEET 4.

Witnesses:
Nathan C. Lombard 2nd
Edna C. Cleveland.

Inventor:
Nathaniel Lombard,
by Walter E. Lombard,
Atty.

No. 781,780. PATENTED FEB. 7, 1905.
N. LOMBARD.
GOVERNOR.
APPLICATION FILED JUNE 29, 1904.

10 SHEETS—SHEET 5.

Witnesses:
Nathan C. Lombard 2nd
Edna C. Cleveland

Inventor:
Nathaniel Lombard,
by Walter E. Lombard,
Atty.

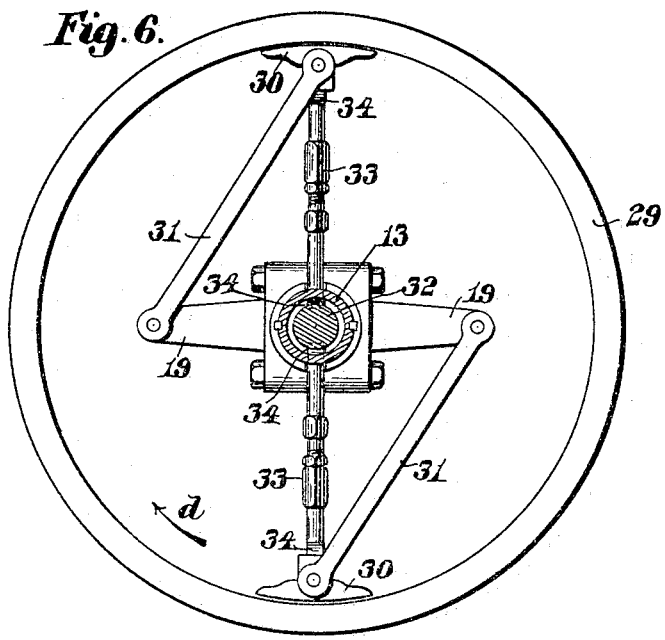

No. 781,780. PATENTED FEB. 7, 1905.
N. LOMBARD.
GOVERNOR.
APPLICATION FILED JUNE 29, 1904.
10 SHEETS—SHEET 7.
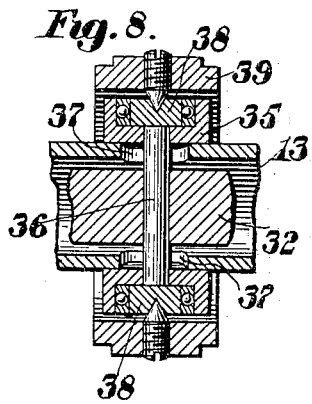
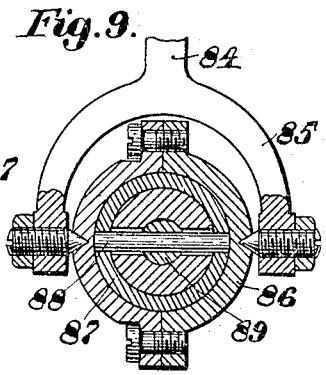
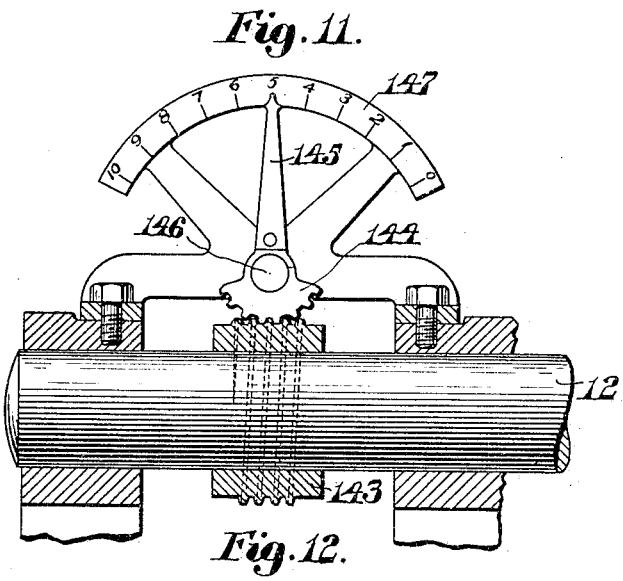
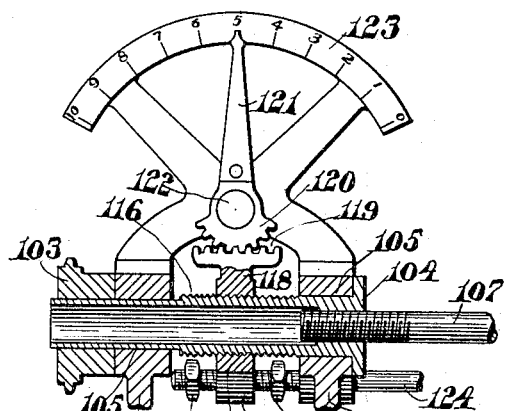
Witnesses:
Nathan C. Lombard 2nd
Edna C. Cleveland
Inventor:
Nathaniel Lombard,
by Walter E. Lombard
Atty.

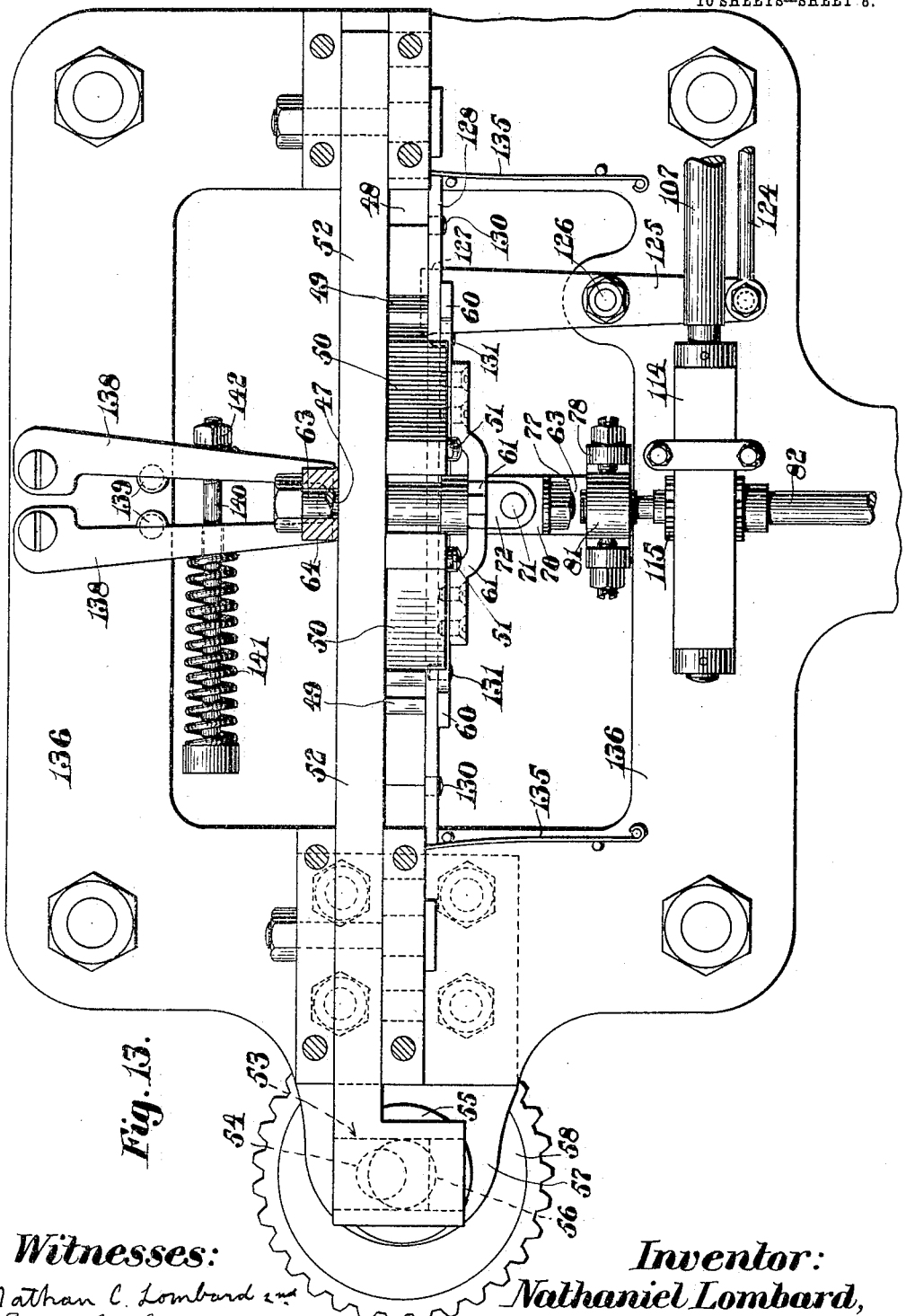

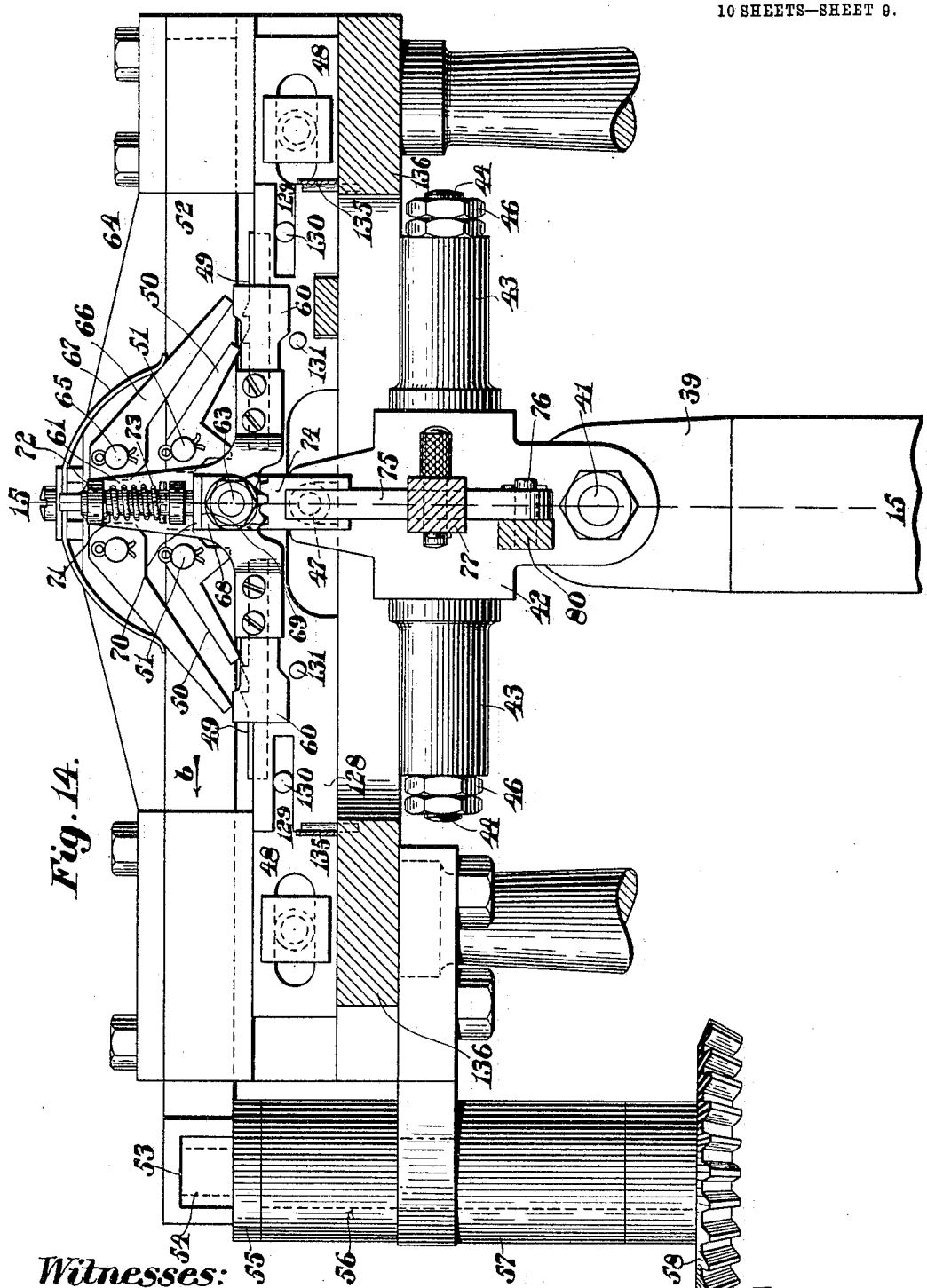

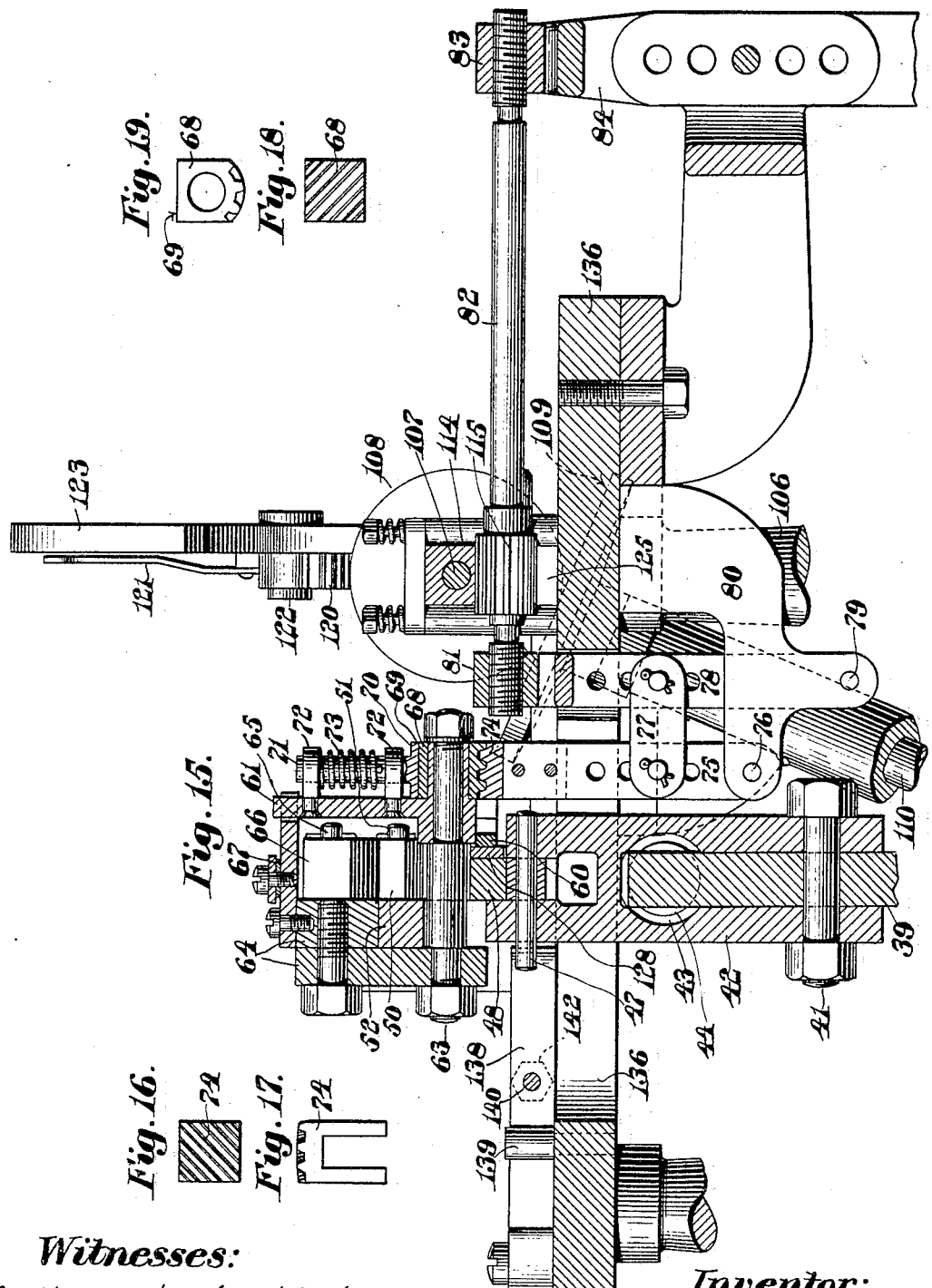

No. 781,780.

Patented February 7, 1905.

UNITED STATES PATENT OFFICE.

NATHANIEL LOMBARD, OF WORCESTER, MASSACHUSETTS, ASSIGNOR TO THE IMPROVED GOVERNOR COMPANY, OF WATERVILLE, MAINE, A CORPORATION OF MAINE.

GOVERNOR.

SPECIFICATION forming part of Letters Patent No. 781,780, dated February 7, 1905.

Application filed June 29, 1904. Serial No. 214,670.

*To all whom it may concern:*

Be it known that I, NATHANIEL LOMBARD, a citizen of the United States of America, and a resident of Worcester, in the county of Worcester and State of Massachusetts, have invented certain new and useful Improvements in Governors, of which the following is a specification.

This invention relates to mechanism for controlling the speed of various motors, and more particularly to such governors which serve to apply power from an auxiliary source to effect the movements of the valve, gate, or other regulating device.

It consists in certain novel features of construction and arrangement of parts, which will be readily understood by reference to the description of the drawings and to the claims to be hereinafter given.

Figure 1:
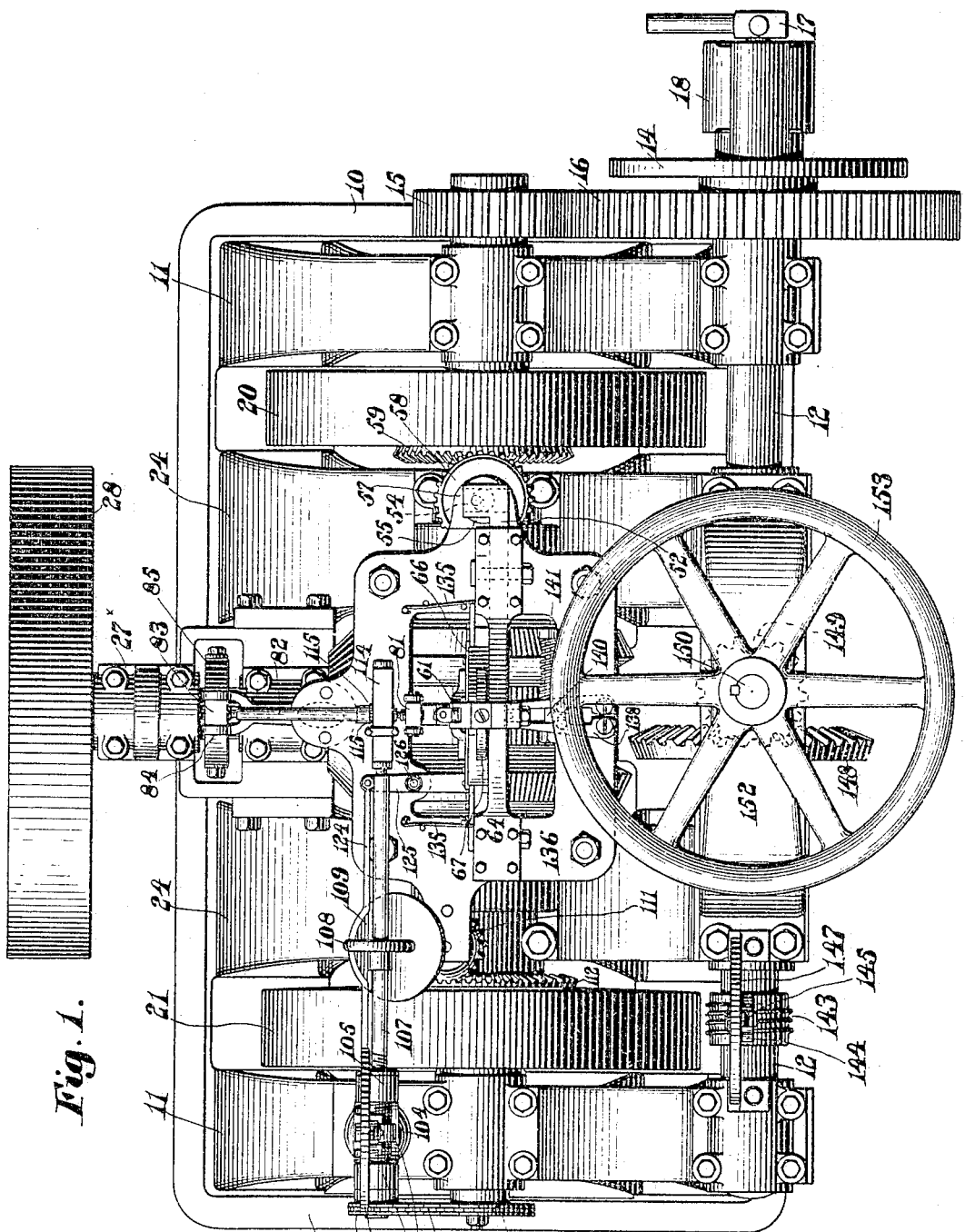
Figure 2:
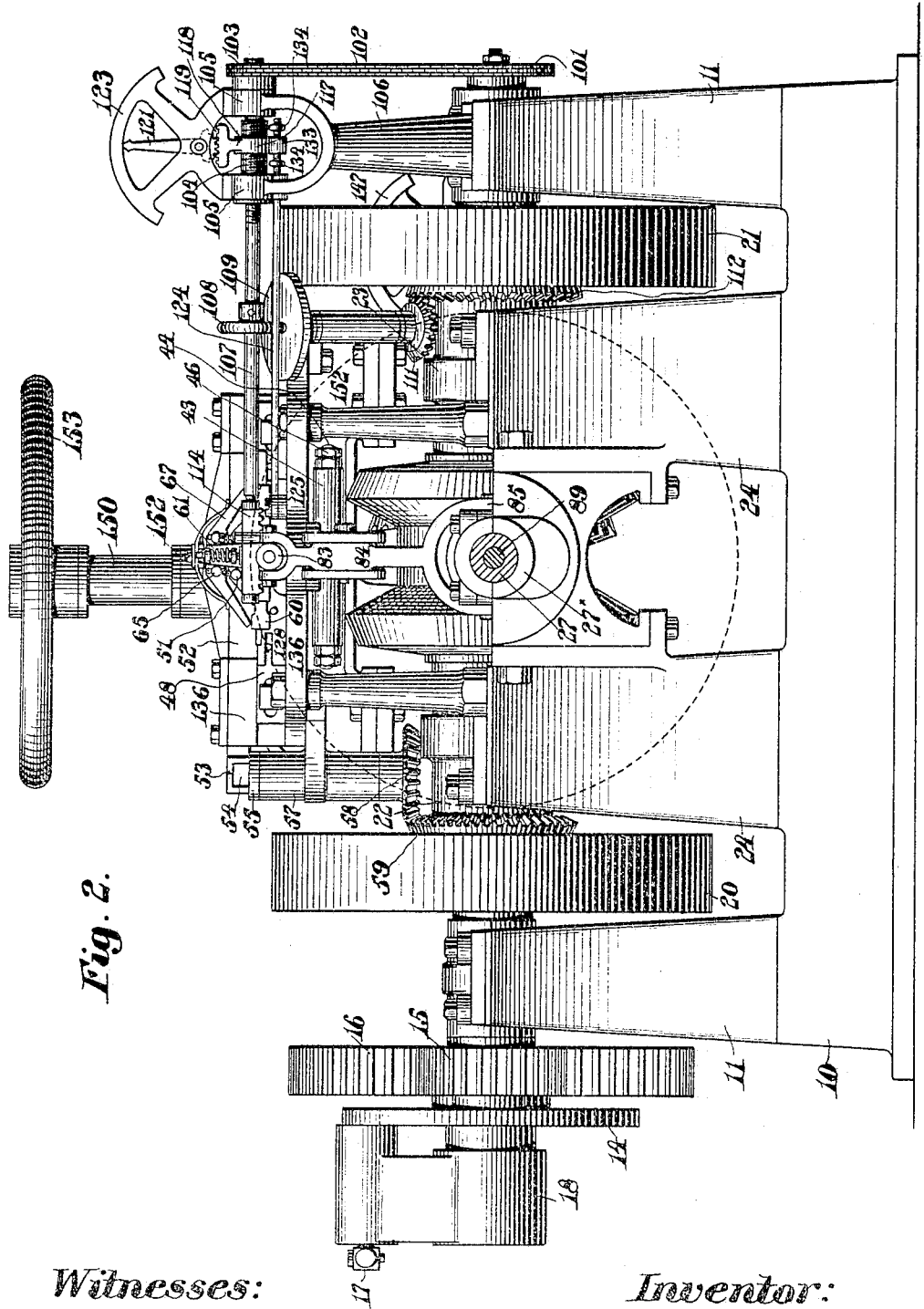
Figure 3:
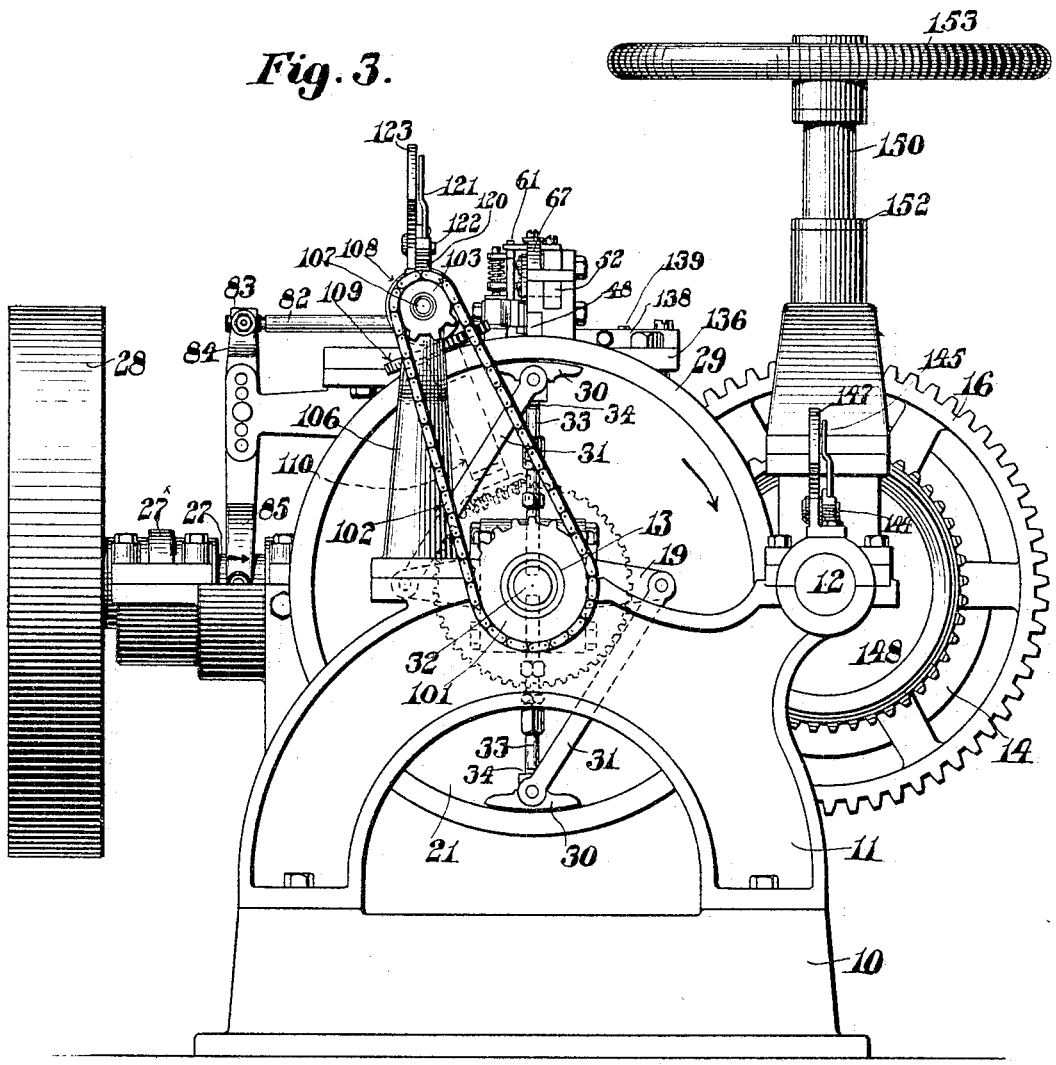
Figure 4:
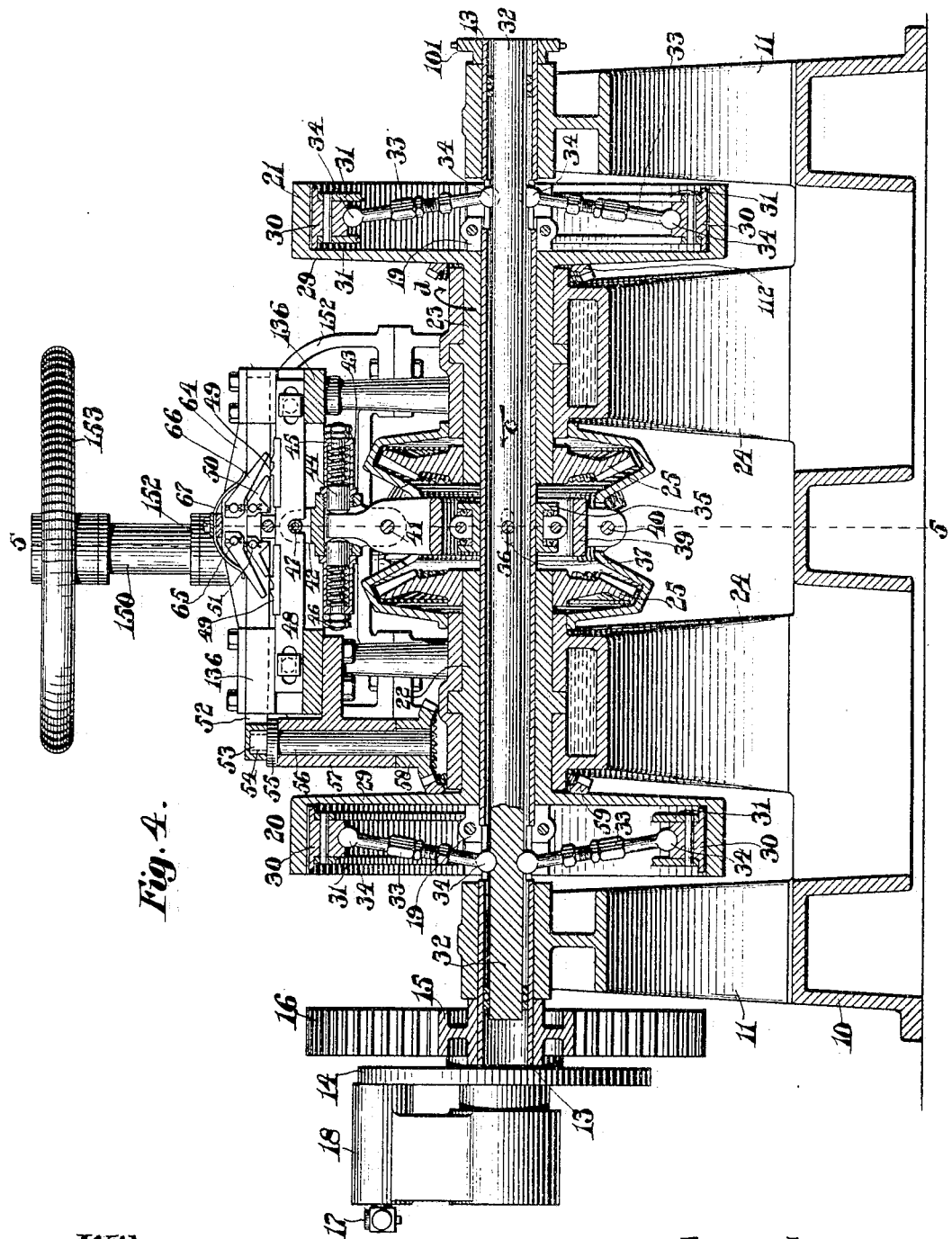
Figure 5:
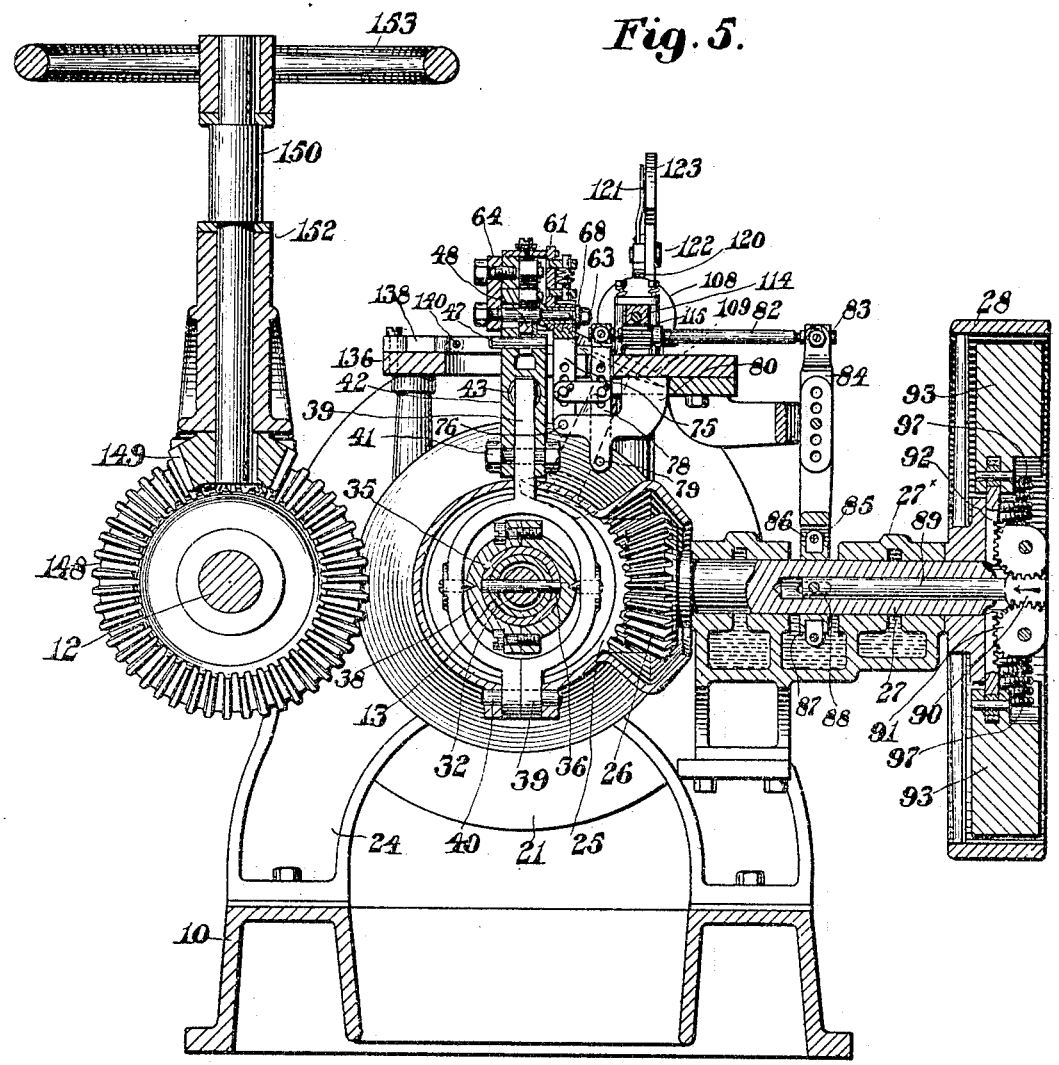

Of the drawings, Figure 1 represents a plan view of a governor embodying the features of this invention. Fig. 2 represents a rear elevation of the same, a portion of the driving mechanism being shown removed therefrom. Fig. 3 represents a left-hand elevation of the same. Fig. 4 represents a longitudinal central vertical section looking toward the front of the machine. Fig. 5 represents a sectional elevation of the same, the cutting plane being on line 5 5 on Fig. 4. Fig. 6 represents a face view of one of the clutch mechanisms. Fig. 7 represents an end elevation of the driving-pulley and the controlling mechanism contained therein. Fig. 8 represents a sectional detail of the operating-member-actuating collars. Fig. 9 represents a sectional detail of the primary driving-shaft and its slidable cooperating member. Fig. 10 represents a sectional detail of the controlling-rod. Fig. 11 represents a sectional elevation of the indicator mechanism operated by the motor-controlling shaft. Fig. 12 represents a sectional elevation of the indicator mechanism operated by the revoluble member coacting with the controlling-rod. Fig. 13 represents a sectional plan of the slidable member, the devices for operating the same, and the devices coacting therewith. Fig. 14 represents a front sectional elevation of the same. Fig. 15 represents a sectional elevation of the same, the cutting plane being on line 15 15 on Fig. 14. Figs. 16 and 17 represent a plan and a front elevation of the lower spiral gear-segment, and Figs. 18 and 19 represent an inverted plan and a front elevation of the upper spiral gear-segment. Figs. 6 and 7 are drawn to an enlarged scale; and Figs. 8 to 19, inclusive, are drawn to a still larger scale.

Similar characters designate like parts throughout the several figures of the drawings.

The numeral 10 designates a suitable base-plate on which is journaled in standards 11 a shaft 12 for connection with the gate or regulating device for controlling the speed of a motor—as, for example, a turbine-wheel—which shaft may be appropriately termed a "motor-controlling" shaft. In the standards 11 may be also journaled a preferably hollow actuating-shaft 13 for the motor-controlling shaft, they being conveniently connected by spur-gears 15 and 16, the latter having secured thereto a disk 14, which is preferably releasably fixed to the shaft 12 by some such connector as a pin-clutch 17, carried by an arm 18, fast upon the shaft and engaging an opening in the disk 14. The actuating-shaft has keyed or otherwise secured to it the laterally-projecting arms 19, forming a part of the inner members of clutches or connectors 20 21, the outer members of which are fixed to or formed integrally with driving-shafts 22 23, respectively, which are here shown as hollow, surrounding the actuating-shaft and journaled in the standards 24, supported from the base-plate between the standards 11. The driving-shafts may be conveniently rotated in opposite directions by a bevel-gear 25, meshing with a bevel-gear 26, fixed to a shaft 27, conveniently journaled in a bracket 27*, supported by the standards 24 and rotated at the desired speed from any suitable source of power through a pulley 28. The outer member of each clutch 21 may consist of a flanged disk 29, while the inner coacting members in each case may consist of a pair of shoes 30, supported by arms 31, articulated to the laterally-projecting arms 19, and between these shoes 30 and the operating-rod 32 are interposed adjustable connectors 33. Either end of each connector 33 is provided with a disk 34, one of which fits into a socket in the shoe 30, while the other fits into a socket in the operating member 32, slidably mounted in the hollow actuating-shaft 13. These adjustable connectors 33 are radial at all times to the axis of the operating member 32, but longitudinal when in normal position, their outer ends being inclined slightly toward each other.

Intermediate the gears 25 a grooved collar 35 is mounted upon the actuating-shaft 13, and a pin 36 extends diametrically from side to side of said collar, said pin extending through a slot 37 in the actuating-shaft 13 and through the operating-rod 32, so that the endwise movement of the collar 35 will transmit its movement to the operating-rod 32 without effecting any longitudinal movement of the actuating-shaft 13. The groove of the collar 35 has mounted therein the annular ring 38, said ring being mounted in an opening in a lever 39, pivoted at 40 and by which an endwise movement is imparted to the collar for the purpose of moving the operating-rod 32.

It is obvious by an inspection of the drawings that whenever the central portion of the operating-rod 32 is moved in a direction away from one of the clutches 20 21 the inner ends of the connectors 33 of that clutch will be moved to a more nearly vertical position, causing the shoes 30 to coact with the flange of the outer clutch member 29, thereby insuring the rotation in unison of the operating member 32, the actuating-shaft 13, with the outer clutch member 29. As soon as the operating member 32 returns to its normal position the shoes 30 will move out of contact with the flange of the outer clutch member 29, and the actuating-shaft and the operating member will cease to revolve. The direction of rotation of the actuating-shaft 13 and the operating member 32 depends upon which pair of clutch members 20 21 is in coacting position, it being understood that the outer clutch members are continuously driven in opposite directions.

The lever 39 has pivoted at 41 a bifurcated member 42, provided with laterally-projecting cylindrical projections 43, in which are mounted plungers 44, the outer ends of which bear against the upper end of the lever 39 and act upon said lever to maintain it in central position, this being effected by the spring 45 coacting with each plunger. The tension of each spring is adjusted by means of the nuts 46. Ordinarily the lever 39 and member 42 operate as a unit; but when any unusual strain occurs the member 42 is permitted to move about the pivot 41 against the tension of the spring 45. The outer end of the member 42 is provided with a pin 47, which engages with a slot in a slidable plate 48, provided on its upper edge with two sets of teeth 49, one set on either side of the pin 47 and each set of teeth facing in opposite directions. Immediately above each set of teeth 49 is a pawl 50, pivoted at 51 to a slidable member 52. One end of said slidable member 52 is provided with a slot 53, in which a pin 54, mounted in a disk 55 and eccentric to the axis of said disk, coöperates to produce a reciprocating movement of the slidable member 52. The disk 55 is formed on the end of a shaft 56, mounted in a suitable bearing 57, and has secured to the opposite end a gear 58, meshing with a gear 59, secured to the outer clutch member of the clutch 20 and continuously revoluble therewith. The slidable member 52 reciprocates continuously, and the pawls 50, carried thereby, pass back and forth above the teeth 49 on the plate 48 without coacting therewith, being prevented from engagement by means of the plates 60, projecting laterally from a pivoted member 61, mounted upon and freely revoluble about a stud 63, secured to a supporting-plate 64. When said pivoted member 61 is in its normal or vertical position the laterally-projecting plates 60 will be in a horizontal position, with the upper edge thereof extending to the top of the teeth 49 of the slidable plate 48, so that during the reciprocation of the slidable member 52 the pawls 50 will pass back and forth above the teeth 49 without being permitted to engage therewith. When the pivoted member 61 is moved about the stud 63, upon which it is mounted, one plate 60 will be moved downwardly to permit a pawl 50 to engage with one of the teeth 49 to move the slidable plate 48 a distance equal to the length of a single tooth. Above the pawls 50 are pivoted at 65 to the supporting-plate 64 stop-pawls 66, which coact with the teeth 49 when it is desired to prevent the return movement of the slidable plate 48. Springs 67 coact with the pawls 66 to retain them in operative position. On the hub of the pivoted member 61 a segment of a spiral gear 68 is mounted and is freely revoluble thereon. The upper portion of said segment 68 is provided with a flat face 69, which bears against the plate 70, which is provided with a shank 71, passing through ears 72, projecting from the pivoted member 61, said plate 70 being held in contact with the face 69 of the segment by means of the spring 73, surrounding said shank. The tension of the spring 73 is sufficient to cause said pivoted member 61 normally to turn about its pivot 63 with said gear-segment 68, but will permit one to operate without the other under any unusual strain.

The gear-segment 68 meshes with a coacting spiral gear-segment 74, secured to a lever 75, pivoted at 76 and connected by a link 77 with a lever 78, pivoted at 79 to a bracket 80. Each lever 75 78 is provided with a plurality of holes by which the link 77 may be adjusted in various positions to vary the movement of the segment 68. The upper end of the lever 78 is bifurcated and has pivoted therein a nut 81, into which is threaded a connector 82, the opposite end of which is threaded into a nut 83, pivoted to the bifurcated outer end of a lever 84. The nuts 81 83 are threaded in opposite directions, so that the rotation of the connector 82 will draw the free ends of the levers 78 84 toward or from each other, as the case may be. The lower end of the lever 84 is bifurcated, as at 85, the bifurcated end of which engages with a split collar 86, mounted in a grooved collar 87, movable endwise upon the driving-shaft 27, this endwise movement being caused by a pin 88, extending through slots in the shaft 27 and passing through a slidable member 89, which member is located within a central bore of said driving-shaft 27 and has its outer end provided on its two sides with a series of rack-teeth 90. The teeth 90 of the slidable member 89 engage with a toothed segment 91, pivoted to the hub of the driving-pulley 28. At right angles to the slidable member 89 and meshing with each segment 91 is a slidable rack 92, the outer end of which is articulated to a centrifugal weight 93, pivoted at 93* to a boss upon the inner periphery of the pulley 28. The outer end of each weight 93 is provided with ears 94, between which is articulated a threaded shank 95, passing through a bushing 96, secured to one end of a spring tension device 97, the opposite end of which is provided with a similar bushing 96, in which is threaded a correspondingly-threaded shank 95, which is articulated to the opposite weight 93 at a point 100, intermediate its fulcrum and its end. The shanks 95, threaded to the bushings 96 at either end of a spring 97, are threaded in opposite directions, so that by a turn of the tension device 97 this device will act as a turnbuckle and draw the two weights or separate them, as desired, to vary the tension of the spring 97. In the normal position of the centrifugal mechanism (shown in Fig. 7) the weights 93 are somewhat removed from the peripheral flange of the pulley 28, and it is obvious that any increase of speed of the pulley will cause the weights 93 to be moved outwardly by the centrifugal action thereon, and this movement will impart, through the racks 92 and segment 91, a sliding movement to the member 89, which movement will impart, through the pin 88, passing through the slots in the driving-shafts 27, a movement of the pivoted lever 84 to cause the operating member 32 to be moved lengthwise through the medium of the connector 82 and levers 78 and 84. A decrease in speed of the pulley 28 will cause the weights to move toward the axis of the shaft 27 to move the various members mentioned in opposite direction to cause the operating member 32 to be moved toward the opposite end of the governor.

To the left end of the actuating-shaft 13 is secured a sprocket-wheel 101. (Shown at the right of Fig. 2.) This sprocket-wheel being keyed to the shaft 13 transmits any rotary motion thereof through the sprocket-chain 102 (see Fig. 3) to a sprocket-wheel 103, secured to a revoluble member 104, mounted in bearings 105 in the bifurcated standard 106, secured to the standards 11 at the left end of the machine. The revoluble member 104 is free to turn within the bearings 105, but is incapable of endwise movement. It is provided with a threaded bore which engages with the threaded end of the controlling-rod 107, this rod having secured thereon a roller 108, which engages with the revoluble disk 109, mounted upon a shaft 110, having secured to its opposite end a gear 111, meshing with a gear 112, secured to the outer clutch member of the clutch 21, said gears 111 112 producing a continuous revolution of the disk 109, the speed of the revolution depending entirely upon the speed of the driving member 29, to which the gear 112 is secured or of which it forms a part. It is obvious from the foregoing description that the rotation of the actuating-shaft 13 may be in either direction, according to which pair of clutch members are operating, and this rotation in either direction of the shaft 13 is transmitted to the revoluble sleeve or member 104, threaded to the controlling-rod 107, and it is obvious that a revolution of said revoluble member in either direction will act upon said controlling-rod 107 to cause the roller 108 to be moved out of its normal position, as indicated in Figs. 1 and 2, diametrically across the disk 109, the length of movement in either direction depending entirely upon the amount of rotation accorded the actuating-shaft 13. The opposite end of the controlling-rod 107 is provided with a rack member 114, the teeth of which mesh with a spur-gear 115, secured to and revolving with the connector 82, and it is obvious that any endwise movement of the controlling-rod 107 will effect a rotary movement of said connector 82, the ends of which are threaded in opposite directions and engage with nuts 81 83, articulated to the outer ends of levers 78 84, as already described. It is evident, therefore, that any increase or decrease of speed will be transmitted, through the pulley 28, to the weights 93, pivoted thereto, and the action of these weights will be transmitted, through the various mechanisms described, to the actuating-shaft 13, and then, through the controlling-rod 107, the connector 82 will be rotated immediately in the nuts 81 83 to increase or decrease the distance between said nuts, as the case may be. As soon, however, as any changes in the relation of the various parts have been effected by the increase or decrease of speed of the motor, so that the roller 108 has been moved diametrically across the disk 109, the revolution of this disk will act upon the roller 108 to rotate it in one direction or the other, depending to which side of the center the roller has been moved. The effect of the rotation of said roller 108 and the consequent rotation of the controlling-rod 107 would be to cause the threaded end of said controlling-rod to be rotated in the threaded sleeve 104 to thereby cause a return of the roller 108 to its normal position central to said revoluble disk 109. The return movement of the controlling-rod 107 effects, through the medium of the rack member 114 and gear 115, a rotation of the connector 82 to cause the threaded ends thereof coöperating with the nuts 81 83 to return the levers 78 84 to their normal positions.

The revoluble sleeve or member 104 is threaded, as at 116, and has mounted thereon a nut 117, which has an upwardly-projecting arm 118, provided with rack-teeth 119, engaging with a segment 120, secured to a pointer 121, pivoted at 122 to a dial 123, said dial 123 being graduated to indicate the position of the gate being controlled by the governor. This movement of the nut 117 endwise of the revoluble member 104 is produced by the revolution of said member, the threads thereon engaging with the threaded portion of said nut to cause an endwise movement thereof, the nut 117 being prevented from turning by means of a projection through which a rod 124 passes. The rod 124 is articulated at its opposite end to a lever 125, pivoted at 126, connected at 127 to a safety-plate 128. The plate 128 is provided at either end with a slot 129, into which projects a guide-pin 130, projecting from the slidable plate 48 and on which said plate is adapted to be moved longitudinally of said plate 48.

The safety-plate 128 has projecting therefrom beneath the laterally-projecting arms 60 pins 131, which are adapted to engage with the lower inclined face of said plates or arms 60 to move the pivoted member 61 into its normal position and disengage the pawls 50 and 66 from engagement with the teeth 49 in the plate 48. The rod 124 is provided with a bearing in the bifurcated support 106 and has adjustably secured thereto on either side of the projection 133 nuts 134, with which said projection 133 engages to cause a movement of said rod in one direction or the other to effect a movement of the safety-plate 128 through the medium of the lever 125 to prevent injury to the various mechanisms, it being required that the nuts 134 should be sufficiently far away from the projection 133 to permit of the ordinary regulation of the speed of the motor without contacting therewith; but should any unusual speed be transmitted to the mechanisms the projection 133 will act upon a nut 134 to effect a movement of the safety-plate 128 to cause the pawls 50 and 66 to be disengaged from the teeth 49 upon the slidable plate 48, so that further engagement therewith is prevented, thus effectually preventing injury to the various mechanisms. This movement of the pivoted member 61 is effected without altering the position of the spiral segment 68, the spring 73 yielding to permit this movement without changing the position of the spiral gear 68.

The safety-plate 128 is retained in a normally central position by means of the spring 135, secured to the supporting-frame 136 and bearing upon either end thereof. The pin 47 in the upper end of the bifurcated member 42 projects to the rear therefrom, the projecting end of which engages with the ends of the pivoted arms 138, the inward movement thereof being limited by stops 139. One arm 138 is provided with a laterally-projecting headed rod 140, between the head of which and the other arm 138 is interposed a spring 141. The tension of the spring 141 is regulated by means of the adjustable nut 142, threaded to the shank 140. This movement of the pin 137 in either direction will move one of the arms 138 away from its stop-pin 139, the other arm 138 being prevented from following the movement of the pin 137 by means of its stop 139. When the power applied to said pin 137 to cause its movement is removed therefrom, the tension of the spring 141 will act through an arm 138 to return said pin to its normal position.

The motor-controlling shaft 12 is provided with a worm 143, which revolves therewith and the teeth of which engage with the segment 144 of the pointer 145, pivoted at 146, said pointer coacting with a dial 147 to indicate the position of the gate or other motor being controlled.

As it may be desired at times to operate the regulating mechanism by hand, the shaft 12 may carry fast upon it a bevel-gear 148, meshing with a bevel-pinion 149 upon a spindle 150, turning in a support 152 and provided with a hand-wheel 153. When this hand-wheel is in use, the pin-clutch 17 may be drawn out of the disk 14 to disconnect the governor from the motor-controlling shaft.

The operation of this improved governor is as follows: When it is desired to use the governor, the hand-wheel 153 is first turned to open the gate or other device being regulated. The dial 148 of the motor-controlling shaft-indicator will disclose the position of said gate or other device. The pin-clutch 17 will be disconnected at this time from the governor mechanism, which will be operated independently until its dial 123 reaches the same point as the dial 147, when the pin-clutch will be engaged to permit the governor and motor-controlling shaft to work in unison. With the parts in the relation here illustrated power is applied to the pulley 28 to drive it left-handedly at such a rate that normally for the desired speed of rotation of the machine the weights of the centrifugal mechanism contained within said pulley will be retained substantially at the center of their range of movement, and the various screws, racks, and the roller 108 will also be at the center of their path. This condition continues until there is a change in the speed of the motor—as, for example, an increase. This results in causing the weights forming part of the centrifugal mechanism to move outwardly under the increased centrifugal force generated, and the racks 92 secured thereto will be moved thereby, and operating through the segment 91 the slidable member 89 will be permitted to move in the direction indicated by the arrows in Figs. 3 and 5. This movement of the slidable member will operate upon the pivoted lever 84 to move the lower end toward the front of the machine, while the upper end is moved in the opposite direction, thereby causing the levers 75 78 to operate, the lever 75, provided with the spiral gear-segment 74, effecting through the gear-segment 68 a movement about its pivot of the member 61 in the direction indicated by the arrow $a$ on Fig. 14. This movement will uncover the teeth 49 on the plate 48, so that during the next movement of the reciprocating member 52 in the direction indicated by the arrow $b$ (see Fig. 14) the left-hand pawl 50 will engage with a tooth on the slidable plate 48 to move it toward the left of said figure. This movement of the slidable plate 48 will act through the medium of the pin 47 in the outer end of the bifurcated member 42 and cause the lever 39 to move about its pivot, thereby moving the operating member 32 in the direction indicated by the arrow $c$ on Fig. 4. This movement of the operating-rod 32 will straighten the toggle-connectors 33 of the left-hand clutch 21 and cause the inner member to coact with the outer member, thereby effecting the rotation of the actuating-shaft in the direction indicated by the arrow $d$ on Figs. 4 and 6. The revolution of the actuating-shaft 13 will be transmitted through the chain 102 to the revoluble member 104. This rotation of the actuating member 13 will impart movement through the gears 15 and 16 to the motor-controlling shaft and cause a closing movement of the gate if, for example, a hydraulic system is being governed or a similar operation upon such motor as may be connected with the shaft 12 and the speed of which it is desired to regulate. The rotation of the actuating-shaft 13 will cause a revolution of the revoluble member 104, thus effecting a movement of the controlling-rod 107 in a direction to increase the distance between the free ends of the levers 80 84, so that the lever 39 will operate more promptly than it would act otherwise, thus effecting an immediate partial correction of the governor, which is continued more gradually until the desired movement is attained. If the weights acted alone upon the controlling mechanism, they would tend to cause too great a movement or to overcorrect. To obviate this difficulty and partially check the movement of the connector 82, the gear 115 on the latter is operated by the rack 114 and moved quickly at the beginning of its movement; but this movement is gradually decreased as the roller moves diametrically across the disk and away from its center. The action of the revoluble sleeve on the controlling-rod is constant, while the rotation of the roller 108 is increased with its distance from the center of the disk 109. This gradual-decreasing effect of the rack 114 upon the gear 115 is due to the increase of speed of the roller 108 as it moves away from the center of the disk 109, which permits the threaded end of the controlling-rod 107 to move more rapidly, screw into the sleeve 104, and thereby more effectually offset the movement of said rod in the opposite direction effected by the action of said revoluble sleeve upon said threaded end. In other words, during the revolution of the member 104 the action of the threads on its bore is to effect constant movement of the rod 107 toward the connector 82, while at the beginning of this movement the rotation of the roller 108 causes only a very slight turning of said threaded end of the rod 107 in the same direction; but as the roller moves farther from the center of the disk 109 and gradually increases in speed the threaded end will turn faster in a direction to practically offset the operation of the revoluble sleeve 104 thereon in the opposite direction. It is evident, therefore, that the initial action of the weights will cause the controlling mechanism to effect a quicker movement of the clutches and regulating mechanism than could be secured if the weights acted alone, and this action on the part of the controlling mechanisms gradually decreases, so that there is no opportunity for the various devices to overcorrect. When the speed decreases and the weights return to their normal operative position, the clutch members 21 are released and the revolution of the actuating-shaft 13 and the member 104 stops. The disk 109 continues to revolve, however, and act upon the roller 108, rotating it and causing the rod 107 to be screwed into the sleeve 104, and this movement of said rod will turn the connector 82 in its nuts 81 83 to decrease the distance between them and return the lever 84 to its normal position, when all of the mechanisms forming a part of the governor will be ready to care for any further increase or decrease in the speed of the motor.

It is obvious that in the operation of the various controlling mechanisms as described the roller 108 will always remain at rest at the center of the disk 109, while the centrifugal weights occupy their normal position; but as soon as the controlling-rod carries the roller off the center to a point having rotary travel the roller and rod upon which it is mounted will be operated thereby in the sleeve 104 until it again reaches the axis of the revoluble disk 109. It will be evident that the farther the weights depart from the normal the farther the roller 108 will be carried from the center of the disk and the more rapidly the shaft 107 upon which said roller is mounted will be rotated, and therefore the neutralizing of the return of the weights will be at a rate varying with the extent of their movement and the distance which the rod has been moved being at first most rapid, then gradually decreasing as the roller returns to the center. The neutralizing effect will, moreover, be substantially proportional to the rate of return of the weights to the normal.

When the connector 82 effects a movement about their pivots of the levers 75 78 in either direction, the spiral gear-segment 74 will coöperate with the spiral gear-segment 68, mounted on the hub of the pivoted member 61, and will cause it to be moved about its pivot, the tension of the spring 73 being sufficient to cause the member 61 to move with the segment 68 under ordinary conditions. When, however, there is an abnormal strain brought to bear upon the parts, the gear-segment 68 will be permitted to move independently of the pivoted member 61, the plate 70 being moved away from the face 69 of said gear-segment 68 against the tension of the spring 73, thereby preventing damage to the mechanisms. In like manner the pivoted lever 39 is provided with the bifurcated member 42, pivoted to its free end and provided with the spring-pressed plungers 44, bearing upon said lever, the tension of the springs 45 thereof being sufficient to normally cause said bifurcated member and lever 39 to normally move about the pivot of said lever; but when an unusual strain is brought to bear upon the slidable plate 48 the bifurcated member is permitted to move about its pivot without effecting a movement of the lever 39 about its pivot, the springs 45 in the projections 43 yielding to permit this operation.

If the pawls 50 are in engagement with the teeth 49 of the plate 48 and an unusual load is suddenly brought to bear upon the governor which would be liable to damage the various mechanisms, the projection 133 will come in contact with one of the nuts 134 upon the rod 124 and through the lever 125 will operate the safety-plate 128, causing the pivoted member 61 to be moved into its normal position to disengage the pawls 50 from engaging with the teeth 49 and prevent further movement of the slidable plate 48, this return movement of the pivoted member 61 being permitted notwithstanding the position of the spiral gear-segment 68, the spring 73 yielding to permit of this return movement.

Having thus described my invention, I claim—

1. In a governor, the combination with an actuating-shaft, of means for rotating said actuating-shaft in opposite directions, connectors between the rotating means and actuating-shaft, a reciprocating member, a slidable plate, means for operating said connectors by a movement of said plate, and mechanism secured to said reciprocating member for sliding said plate.

2. In a governor, the combination with an actuating-shaft, of means for rotating said actuating-shaft in opposite directions, connectors between the rotating means and actuating-shaft, a reciprocating member, a slidable plate, means for operating said connectors by a movement of said plate, mechanism secured to said reciprocating member for sliding said plate, and means secured to a driving member for operating said reciprocating member.

3. In a governor, the combination with an actuating-shaft, of means for rotating said actuating-shaft in opposite directions, connectors between the rotating means and actuating-shaft, a reciprocating member, a pawl secured thereto, a slidable plate provided with a plurality of teeth adapted to be engaged by said pawl, and means for operating said connectors by a movement of said plate.

4. In a governor, the combination with an actuating-shaft, of means for rotating said actuating-shaft in opposite directions, connectors between the rotating means and actuating-shaft, a reciprocating member, a pawl secured thereto, a slidable plate provided with a plurality of teeth adapted to be engaged by said pawl, means for operating said connectors by a movement of said plate, and means for normally preventing the engagement of said pawl.

5. In a governor, the combination with an actuating-shaft, of means for rotating said actuating-shaft in opposite directions, connectors between the rotating means and actuating-shaft, a reciprocating member, pawls secured thereto operating in opposite directions, a slidable plate provided with a plurality of teeth adapted to be engaged by said pawls, means for operating said connectors by a movement of said plate, and means for normally preventing the engagement of said pawls.

6. In a governor, the combination with an actuating-shaft, of means for rotating said actuating-shaft in opposite directions, connectors between the rotating means and actuating-shaft, a reciprocating member, a transverse groove therein, a revoluble crank coöperating with said groove to reciprocate said member, a slidable plate, means for operating said connectors by a movement of said plate, and means secured to said reciprocating member for operating said slidable plate.

7. In a governor, the combination with an actuating-shaft, of means for rotating said actuating-shaft in opposite directions, connectors between the rotating means and actuating-shaft, a reciprocating member, a transverse groove therein, a revoluble crank coöperating with said groove to reciprocate said member, gears rotated by a driving member for revolving said crank, a slidable plate, means for operating said connectors by a movement of said plate, and means secured to said reciprocating member for operating said slidable plate.

8. In a governor, the combination with an actuating-shaft, of means for rotating said actuating-shaft in opposite directions, connectors between the rotating means and actuating-shaft, a reciprocating member, a slidable plate, means secured to said reciprocating member for operating said slidable plate, a pin secured to said slidable plate, a bifurcated lever coacting with said pin, and an operating member movable by said lever and adapted in its movement to operate one of said connectors.

9. In a governor, the combination with an actuating-shaft, of means for rotating said actuating-shaft in opposite directions, connectors between the rotating means and actuating-shaft, a reciprocating member, a slidable plate, means secured to said member for moving said slidable plate, means interposed between said plate and said connectors whereby one of said connectors will be operated by a movement of said plate in either direction, and a pivoted member adapted normally to prevent a movement of said plate by said reciprocating member.

10. In a governor, the combination with an actuating-shaft, of means for rotating said actuating-shaft in opposite directions, connectors between the rotating means and actuating-shaft, a reciprocating member, a slidable plate, means secured to said member for moving said slidable plate, means interposed between said plate and said connectors whereby one of said connectors will be operated by a movement of said plate in either direction, and a pivoted member provided with laterally-projecting arms adapted to prevent the movement of said plate by said reciprocating member.

11. In a governor, the combination with an actuating-shaft, of means for rotating said actuating-shaft in opposite directions, connectors between the rotating means and actuating-shaft, a reciprocating member, a pawl secured thereto, a slidable plate provided with a plurality of teeth adapted to be engaged by said pawl, and a pivoted member provided with laterally-projecting arms adapted to prevent the movement of said plate by said reciprocating member.

12. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl pivoted to said reciprocating member adapted to engage with each set of teeth, and means for operating said connectors by a movement of said plate.

13. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl pivoted to said reciprocating member adapted to engage with each set of teeth, and means for normally preventing the engagement of said pawls with said teeth.

14. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl pivoted to said reciprocating member adapted to engage with each set of teeth, and a pivoted member provided with laterally-projecting arms for preventing the engagement of said pawl with said teeth.

15. In a governor, the combination with an actuating-shaft, of means for rotating said actuating-shaft in opposite directions, connectors between the rotating means and actuating-shaft, a reciprocating member, a slidable plate, means secured to said reciprocating member for moving said plate, means for operating said connectors by a movement of said plate, and means for normally maintaining said plate in central position.

16. In a governor, the combination with an actuating-shaft, of means for rotating said actuating-shaft in opposite directions, connectors between the rotating means and actuating-shaft, a reciprocating member, a slidable plate, means secured to said reciprocating member for moving said plate, means for operating said connectors by a movement of said plate, a projection on said plate, and spring-pressed arms coöperating with said projection to maintain said plate in central position.

17. In a governor, the combination with an actuating-shaft, of means for rotating said actuating-shaft in opposite directions, connectors between the rotating means and actuating-shaft, a reciprocating member, a slidable plate, means secured to said reciprocating member for moving said plate, means for operating said connectors by a movement of said plate, a projection on said plate, two pivoted arms engaging with said projection, a headed rod passing through one of said arms and secured to the other, and a spring interposed between said head and the first-mentioned arm.

18. In a governor, the combination with an actuating-shaft, of means for rotating said actuating-shaft in opposite directions, connectors between the rotating means and actuating-shaft, a reciprocating member, a slidable plate, means secured to said reciprocating member for moving said plate, means for operating said connectors by a movement of said plate, a projection on said plate, two pivoted arms engaging with said projection, stops for said arms to limit the inner movement thereof, a headed rod passing through one of said arms and secured to the other, and a spring interposed between said head and the first-mentioned arm.

19. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl secured to said reciprocating member for engagement with each set of teeth, a pin projecting from said slidable plate, means interposed between said pin and said connectors whereby one connector will be operated by a movement of said plate in either direction, and means for normally retaining said plate in central position.

20. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl secured to said reciprocating member for engagement with each set of teeth, a pin projecting from said slidable plate, means interposed between said pin and said connectors whereby one connector will be operated by a movement of said plate in either direction, two arms engaging with said pin, and a spring coöperating with said arm to retain said slidable plate in central position.

21. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl secured to said reciprocating member for engagement with each set of teeth, a pin projecting from said slidable plate, means interposed between said pin and said connectors whereby one connector will be operated by a movement of said plate in either direction, two arms engaging with said pin, stops for said arms, and a spring for coöperating with said arms to retain said slidable plate normally in central position.

22. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl for engagement with each set of teeth secured to said reciprocating member, a pin projecting from said slidable plate, means interposed between said pin and said connectors whereby one connector will be operated by a movement of said plate in either direction, two arms engaging with said pin, stops to limit the inward movement of said arms, a headed rod passing through one of said arms and secured to the other, a spring interposed between said head and the first-mentioned arm, and means for regulating the tension of said spring.

23. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl for engaging with each set of teeth secured to said reciprocating member, means for operating one of said connectors by a movement of said plate in either direction, a pivoted member provided with laterally-projecting arms for normally preventing the engagement of said pawls with said teeth, means for moving said member about its pivot, and means for returning said pivoted member to its normal position.

24. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl secured to said reciprocating member for engaging with each set of teeth, means for operating one of said connectors by a movement of said plate in either direction, a pivoted member provided with laterally-projecting arms for normally preventing the engagement of said pawls with said teeth, a safety-plate provided with projections adapted for engagement with the lower edge of said arms when said pivoted member is moved about its pivot, and means for moving said safety-plate to return said pivoted member to its normal position.

25. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl secured to said reciprocating member for engaging with each set of teeth, means for operating one of said connectors by a movement of said plate in either direction, a pivoted member provided with laterally-projecting arms for normally preventing the engagement of said pawls with said teeth, a safety-plate provided with projections adapted for engagement with the lower edge of said arms when said pivoted member has been moved about its pivot, a pivoted lever adapted to move said plate, a rod secured to said pivoted lever and provided with shoulders, and a movable member adapted to engage with said shoulders to operate said safety-plate and return said pivoted member to its normal position.

26. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl secured to said reciprocating member for engaging with each set of teeth, means for operating one of said connectors by a movement of said plate in either direction, a pivoted member provided with laterally-projecting arms for normally preventing the engagement of said pawls with said teeth, a safety-plate provided with projections adapted for engagement with the lower edge of said arms when said pivoted member has been moved about its pivot, a pivoted lever adapted to move said plate, a rod secured to said pivoted lever and provided with adjustable shoulders, and a movable member adapted to engage with said adjustable shoulders to operate said safety-plate and return said pivoted member to its normal position.

27. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl secured to said reciprocating member for engaging with each set of teeth, means for operating one of said connectors by a movement of said plate in either direction, a pivoted member provided with laterally-projecting arms for normally preventing the engagement of said pawls with said teeth, a safety-plate provided with projections adapted for engagement with the lower edge of said arms when said pivoted member is moved about its pivot, and means for retaining said safety-plate normally in central position.

28. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl secured to said reciprocating member for engaging with each set of teeth, means for operating one of said connectors by a movement of said plate in either direction, a pivoted member provided with laterally-projecting arms for normally preventing the engagement of said pawls with said teeth, a safety-plate provided with projections adapted for engagement with the lower edge of said arms when said pivoted member is moved about its pivot, a pivoted lever adapted to move said plate, a rod secured to said pivoted lever and provided with shoulders, a movable member adapted to engage with said shoulders to operate said safety-plate and return said pivoted member to its normal position, and means for retaining said safety-plate normally in central position.

29. In a governor, the combination with an actuating-shaft, of means for rotating said actuating-shaft in opposite directions, connectors between the rotating means and actuating-shaft, a reciprocating member, a slidable plate provided with two sets of teeth facing in opposite directions, a pawl secured to said reciprocating member for engaging with said teeth, means for operating one of said connectors by a movement of said plate in either direction, a pivoted member provided with laterally-projecting arms for normally preventing the engagement of said pawls with said teeth, a safety-plate provided with projections adapted for engagement with the lower edge of said arms when said pivoted member is moved about its pivot, a pivoted lever adapted to move said plate, a rod secured to said pivoted lever and provided with shoulders, a movable member adapted to engage with said shoulders to operate said safety-plate and return said pivoted member to its normal position, and springs coacting with the ends of said plate to retain it normally in central position.

30. In a governor, the combination with an actuating-shaft, of means for rotating said actuating-shaft in opposite directions, connectors between the rotating means and actuating-shaft, a reciprocating member, a slidable plate, means secured to said reciprocating member for moving said plate, and a pivoted member provided with laterally-projecting arms for normally preventing the movement of said plate by said reciprocating member.

31. In a governor, the combination with an actuating-shaft, of means for rotating said actuating-shaft in opposite directions, connectors between the rotating means and actuating-shaft, a reciprocating member, a slidable plate, means secured to said reciprocating member for moving said plate, a pivoted member provided with laterally-projecting arms for normally preventing the movement of said plate by said reciprocating member, a spring-pressed plate secured to said pivoted member, and means for moving said pivoted member about its pivot through the medium of said plate.

32. In a governor, the combination with an actuating-shaft, of means for rotating said actuating-shaft in opposite directions, connectors between the rotating means and actuating-shaft, a reciprocating member, a slidable plate, means secured to said reciprocating member for moving said plate, a pivoted member provided with laterally-projecting arms for normally preventing the movement of said plate by said reciprocating member, a gear-segment mounted upon and freely revoluble on the hub of said pivoted member, means for oscillating said segment, and means for moving said pivoted member about its pivot by the oscillation of said segment.

33. In a governor, the combination with an actuating-shaft, of means for rotating said actuating-shaft in opposite directions, connectors between the rotating means and actuating-shaft, a reciprocating member, a slidable plate, means secured to said reciprocating member for moving said plate, a pivoted member provided with laterally-projecting arms for normally preventing the movement of said plate by said reciprocating member, a gear-segment mounted upon and freely revoluble on the hub of said pivoted member, means for oscillating said segment, and a spring-pressed plate secured to said pivoted member and coacting with said gear-segment to cause said member to be moved about its pivot by the movement of said segment.

34. In a governor, the combination with an actuating-shaft, of means for rotating the actuating-shaft in opposite directions, connectors between the rotating means and actuating-shaft, a reciprocating member, a slidable plate, means secured to said reciprocating member for moving said plate, a pivoted member provided with laterally-projecting arms for normally preventing the movement of said plate by said reciprocating member, a gear-segment provided with a flat face, a plate coacting therewith, shanks from said plate mounted in ears on said pivoted member, a spring for forcing said plate into engagement with said segment, and means for oscillating said segment to effect a movement of the pivoted member about its pivot in either direction.

35. In a governor, the combination with an actuating-shaft, of means for rotating the actuating-shaft in opposite directions, connectors between the rotating means and actuating-shaft, a reciprocating member, a slidable plate provided with two sets of teeth facing in opposite directions, means secured to said reciprocating member for engaging said teeth to move said plate, a pivoted member controlling the movement of said plate, a gear-segment for operating the pivoted member, and a yielding device interposed between said segment and said member adapted normally to coöperate with said segment but to yield under undue stress thereon.

36. In a governor, the combination with an actuating-shaft, of means for rotating the actuating-shaft in opposite directions, connectors between the rotating means and actuating-shaft, a reciprocating member, a slidable plate, means secured to said reciprocating member for moving said plate, a pivoted member for controlling the operation of said plate, a spiral gear-segment upon the hub of said pivoted member and adapted to move said member about its pivot, a second spiral gear-segment coöperating therewith, a lever supporting the same, and means for moving said lever to effect a movement of said pivoted member.

37. In a governor, the combination with an actuating-shaft, of means for rotating the actuating-shaft in opposite directions, connectors between the rotating means and actuating-shaft, a reciprocating member, a slidable plate, means secured to said reciprocating member for moving said plate, a pivoted member for controlling the operation of said plate, a spiral gear-segment upon the hub of said member and adapted to move said member about its pivot, a second spiral gear-segment coöperating therewith, a lever supporting the same, a second lever, a link interposed between said levers, and means for moving said levers to effect a movement of said pivoted member.

38. In a governor, the combination with an actuating-shaft, of means for rotating the actuating-shaft in opposite directions, connectors between the rotating means and actuating-shaft, a reciprocating member, a slidable plate, means secured to said reciprocating member for moving said plate, a pivoted member for controlling the operation of said plate, a spiral gear-segment upon the hub of said member and adapted to move said member about its pivot, a second spiral gear-segment coöperating therewith, a lever supporting the same, a second lever, an adjustable link interposed between said levers, and means for moving said levers to effect a movement of said pivoted member.

39. In a governor, the combination with an actuating-shaft, of means for rotating the actuating-shaft in opposite directions, connectors between the rotating means and actuating-shaft, a reciprocating member, a slidable plate, means secured to said reciprocating member for moving said plate, a pivoted member for controlling the operation of said plate, a spiral gear-segment upon the hub of said pivoted member and adapted to move said member about its pivot, a second spiral gear-segment coöperating therewith, a lever supporting the same, a second lever, a plurality of holes in said levers, a link interposed between said levers and adapted to be secured in either pair of said holes, and means for moving said levers to effect a movement of said pivoted member.

40. In a governor, the combination with an actuating-shaft, of means for rotating the actuating-shaft in opposite directions, connectors between the rotating means and actuating-shaft, a reciprocating member, a slidable plate, means secured to said reciprocating member for moving said plate, a pivoted lever connected at its free end to said plate, and means for operating one of said connectors by a movement of said lever in either direction.

41. In a governor, the combination with an actuating-shaft, of means for rotating said actuating-shaft in opposite directions, connectors between the rotating means and actuating-shaft, a reciprocating member, a slidable plate, means secured to said reciprocating member for moving said plate, a two-part pivoted lever the free end of the outer member of which engages with said slidable plate, and means for normally retaining said outer member in central position but permitting it to move independently of the main portion of said lever under exceptional strain.

42. In a governor, the combination with an actuating-shaft, of means for rotating said actuating-shaft in opposite directions, connectors between the rotating means and actuating-shaft, a slidable plate, a two-part pivoted lever the free end of the outer member of which engages with said slidable plate, and means for normally retaining said outer member in central position but permitting it to move independently of the main portion of said lever under exceptional strain.

43. In a governor, the combination with an actuating-shaft, of means for rotating said actuating-shaft in opposite directions, connectors between the rotating means and actuating-shaft, a reciprocating member, a slidable plate, means secured to said reciprocating member for moving said plate, a pivoted lever, means for operating one of said connectors by a movement of said lever in either direction, a bifurcated member pivoted to the free end of said lever, a pin in the outer end of said bifurcated member engaging with said slidable plate, and a yielding means secured to said bifurcated member coacting with the free end of said lever permitting said bifurcated member to move about its pivot under abnormal strains without moving said lever.

44. In a governor, the combination with an actuating-shaft, of means for rotating said actuating-shaft in opposite directions, connectors between the rotating means and actuating-shaft, a slidable plate, a pivoted lever, means for operating one of said connectors by a movement of said lever in either direction, a bifurcated member pivoted to the free end of said lever, a pin in the outer end of said bifurcated member engaging with said slidable plate, and a yielding means secured to said bifurcated member coacting with the free end of said lever permitting said bifurcated member to move about its pivot under abnormal strains without moving said lever.

45. In a governor, the combination with an actuating-shaft, of means for rotating said actuating-shaft in opposite directions, connectors between the rotating means and actuating-shaft, a reciprocating member, a slidable plate, means secured to said reciprocating member for moving said plate, a pivoted lever, a bifurcated member pivoted to the free end thereof provided with laterally-projecting cylinders, spring-pressed plungers mounted in said cylinders and coöperating with a projection from said lever, and a pin in the outer end of said bifurcated member engaging with said slidable plate.

46. In a governor, the combination with an actuating-shaft, of means for rotating said actuating-shaft in opposite directions, connectors between the rotating means and actuating-shaft, a slidable plate, a pivoted lever, a bifurcated member pivoted to the free end thereof provided with laterally-projecting cylinders, spring-pressed plungers mounted in said cylinders and coöperating with a projection from said lever, and a pin in the outer end of said bifurcated member engaging with said slidable plate.

47. In a governor, the combination with an actuating-shaft, of means for rotating said actuating-shaft in opposite directions, connectors between the rotating means and actuating-shaft, a reciprocating member, a slidable plate, means secured to said reciprocating member for moving said plate, a pivoted lever, a bifurcated member provided with laterally-projecting cylinders, plungers mounted in said cylinders bearing upon the outer end of said lever and provided with shanks extending through the outer end of said cylinders, springs surrounding said shanks between said plungers and the cylinder-heads, and means secured to the outer ends of said shanks for adjusting the tension of said springs.

48. In a governor, the combination with an actuating-shaft, of means for rotating said actuating-shaft in opposite directions, connectors between the rotating means and actuating-shaft, a slidable plate, a pivoted lever, a bifurcated member provided with laterally-projecting cylinders, plungers mounted in said cylinders bearing upon the outer end of said lever and provided with shanks extending through the outer end of said cylinders, springs surrounding said shanks between said plungers and the cylinder-heads, and means secured to the outer ends of said shanks for adjusting the tension of said springs.

49. In a governor, the combination with an actuating-shaft, of two oppositely-rotating driving-shafts, pairs of coacting clutch members, one member of each pair being secured to the actuating-shaft and the other to a driving-shaft, an operating member, and a rigid connector between said operating member and a clutch member.

50. In a governor, the combination with an actuating-shaft, of two oppositely-rotating driving-shafts, an outer clutch member secured to each driving-shaft, a laterally-projecting arm for each clutch member secured to said actuating-shaft, a shoe secured by a link to the free end of said arm, a conductor between each shoe and said operating member, and means for moving the inner ends of said connectors longitudinally of said shaft to set said clutch.

51. In a governor, the combination with an actuating-shaft, of two oppositely-rotating driving-shafts, an outer clutch member secured to each driving-shaft, a laterally-projecting arm for each clutch member secured to said actuating-shaft, a shoe secured by a link to the free end of each arm, an operating member, and means for setting said clutches by a longitudinal movement of said operating member.

52. In a governor, the combination of an actuating-shaft, two oppositely-rotating driving-shafts, pairs of coacting clutch members carried by the actuating-shaft and driving-shafts, an operating member, a connector between said operating member and each inner clutch member, and means for operating said connectors by a longitudinal movement of said operating member to set the clutches.

53. In a governor, the combination of an actuating-shaft, two oppositely-rotating driving-shafts, pairs of coacting clutch members carried by the actuating-shaft and driving-shafts, an operating member, a connector between said operating member and each inner clutch member, means for operating said connectors by a longitudinal movement of said operating member to set the clutches, and mechanism operated by said clutch members for releasing them from engagement and returning the parts to their normal positions.

54. In a governor, the combination of a hollow actuating-shaft, two oppositely-rotating driving-shafts, pairs of coacting clutch members carried by the actuating-shaft and driving-shafts, an operating member located within said hollow actuating-shaft, means for moving said operating member endwise, shoes supported by said actuating-shaft, and a connector between said operating member and each shoe adapted to be operated by a longitudinal movement of said operating member.

55. In a governor, the combination of a hollow actuating-shaft, two oppositely-rotating driving-shafts, pairs of coacting clutch members carried by the actuating-shaft and driving-shafts, a slidable operating member located within said actuating-shaft and adapted in its longitudinal movement to set one of the clutches, a sprocket-wheel mounted on the outer end of said actuating-shaft and revoluble therewith, and mechanism actuated by said sprocket-wheel when the clutch members are in engagement for releasing them from engagement and returning the parts to their normal positions.

56. In a governor, the combination of a hollow actuating-shaft, two oppositely-rotating driving-shafts, pairs of coacting clutch members carried by the actuating-shaft and driving-shafts, shoes coöperating with the inner periphery of the driving-shaft clutch member, an operating member within the hollow actuating-shaft, and an adjustable connector between each of said shoes and said operating member and adapted to move said shoes into engagement with the outer clutch member by a longitudinal movement of said operating member.

57. In a governor, the combination of a motor-controlling shaft, an indicator-dial, and a pivoted pointer coöperating therewith operated by said shaft and adapted to indicate upon said dial the position of the gate or other mechanism being regulated.

58. In a governor, the combination of a motor-controlling shaft, a worm thereon, a pivoted indicator-pointer operated thereby, and a coöperating dial therefor upon which the position of the gate or other mechanism being regulated is adapted to be indicated.

59. In a governor, the combination of a motor-controlling shaft, a dial, and a pivoted pointer therefor operated by said shaft to indicate the position of the gate or other mechanism being regulated.

60. In a governor, the combination of a motor-controlling shaft, a dial, a pivoted pointer therefor provided with a gear-segment, and a worm upon said shaft coöperating with said segment to move said pointer about said dial to indicate thereon the position of the gate or other mechanism being regulated.

61. In a governor, the combination of a motor-controlling shaft, an indicator-dial, a pointer therefor operated by the motor-controlling shaft, a second dial, a pointer therefor, a segment thereon, a rack meshing therewith, and means for moving said rack to operate said pointer when the power is decreased or increased.

62. In a governor, the combination of a motor-controlling shaft, an indicator-dial, a pointer therefor operated by said shaft, a second dial, a pointer therefor, and mechanism independent of the motor-controlling shaft for operating the second pointer.

Signed by me at Boston, Massachusetts, this 1st day of June, 1904.

NATHANIEL LOMBARD.

Witnesses:
   WALTER E. LOMBARD,
   EDNA C. CLEVELAND.